(12) United States Patent
Elliott et al.

(10) Patent No.: US 12,555,989 B2
(45) Date of Patent: Feb. 17, 2026

(54) MODULAR POWER AND/OR DATA SYSTEM

(71) Applicant: ZETR Pty Ltd, Mona Vale (AU)

(72) Inventors: Garth Elliott, Mona Vale (AU); Joseph Romano, Mona Vale (AU)

(73) Assignee: ZETR Pty Ltd, Mona Vale (AU)

( * ) Notice: Subject to any disclaimer, the term of this patent is extended or adjusted under 35 U.S.C. 154(b) by 308 days.

(21) Appl. No.: 18/198,659

(22) Filed: May 17, 2023

(65) Prior Publication Data

US 2023/0378734 A1 Nov. 23, 2023

(30) Foreign Application Priority Data

May 20, 2022 (AU) ................................ 2022203459

(51) Int. Cl.
| | | |
|---|---|---|
| *H01R 13/518* | (2006.01) | |
| *H02G 3/08* | (2006.01) | |
| *H02G 3/12* | (2006.01) | |
| *H02G 3/14* | (2006.01) | |
| *H02G 3/16* | (2006.01) | |

(52) U.S. Cl.
CPC ............. *H02G 3/16* (2013.01); *H02G 3/088* (2013.01); *H01R 13/518* (2013.01); *H02G 3/12* (2013.01); *H02G 3/14* (2013.01)

(58) Field of Classification Search
CPC ............. H02G 3/16; H02G 3/088; H02G 3/12; H02G 3/14; H01R 13/518
USPC ......................................... 439/527, 535, 538
See application file for complete search history.

(56) References Cited

U.S. PATENT DOCUMENTS

| | | | | |
|---|---|---|---|---|
| 7,306,482 B1* | 12/2007 | Kldman | ................. | H01R 13/66 |
| | | | | 439/538 |
| 7,342,173 B1* | 3/2008 | Kidman | ................... | H01H 9/02 |
| | | | | 174/58 |
| 8,084,687 B1* | 12/2011 | Thurman | ............... | H02G 3/125 |
| | | | | 439/535 |
| 8,610,004 B2* | 12/2013 | Solan | .................... | H02G 3/123 |
| | | | | 174/502 |
| 9,331,443 B1 | 5/2016 | Hayden et al. | | |
| 2011/0056743 A1 | 3/2011 | Solan | | |
| 2014/0224792 A1 | 8/2014 | Beneke | | |
| 2014/0238738 A1 | 8/2014 | Korcz et al. | | |
| 2018/0375310 A1 | 12/2018 | Elliott et al. | | |

(Continued)

OTHER PUBLICATIONS

Extended European Search Report (EESR) for Application No. 23174361.8, dated Oct. 20, 2023.

(Continued)

*Primary Examiner* — Tulsidas C Patel
(74) *Attorney, Agent, or Firm* — MARSHALL, GERSTEIN & BORUN LLP

(57) ABSTRACT

A modular power and/or data system for mounting to a substrate includes a housing for connection to rear surface of substrate. The housing includes a base, a top, and sidewalls. The top has a peripheral flange extending outwardly from sidewalls and has openings to receive fasteners for connecting housing to rear surface of substrate. The base and sidewalls define an interior volume of the housing, and the top defines an opening into the interior volume. A frame for mounting at least one electrical power or data port in the opening of the substrate is connected relative to the housing. The relative connection between the housing and the frame permits adjustment of a spacing S between the housing base and the frame.

14 Claims, 5 Drawing Sheets

(56) References Cited

U.S. PATENT DOCUMENTS

2022/0006277 A1\*  1/2022  Beristany ............... H02G 3/123
2022/0158431 A1\*  5/2022  Johnson et al. ......... H02G 3/14
                                                                174/50

OTHER PUBLICATIONS

Australian Examination Report for Application No. 2022203459, dated Mar. 17, 2023.
Extended European Search Report (EESR) Application No. 23174361.8 dated Mar. 12, 2024.

\* cited by examiner

MODULAR POWER AND/OR DATA SYSTEM

CROSS-REFERENCE

This application claims priority to Australian Patent Application No. 2022203459, filed May 20, 2022 and entitled "Modular power and/or data system", the contents of which are incorporated by reference herein in their entirety.

TECHNICAL FIELD

The disclosure herein relates to a modular power and/or data system for mounting to a substrate in a recessed fashion, such that an exterior face of the system is flush, or substantially flush, with an exterior face of the substrate. The system has been developed primarily for installation in substrates such as table tops, counter tops, desk tops, bench tops, counter fronts, counter sides, cubicle walls, and the like.

BACKGROUND

Recessed power and data systems are known. However, such systems can be susceptible to ingress of liquid and/or particulate matter. Ingress of liquid and/or particulate matter can cause damage to electrical and data components of the system.

Known recessed power and data systems can also be difficult to install and, at least in some cases, must be installed by a suitably qualified electrical tradesperson.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Disclosed herein is a modular power and/or data system for mounting to a substrate, the substrate having a front surface and a rear surface and an opening extending through substrate from the front surface to the rear surface, the system comprising:
  a housing for connection to the rear surface of the substrate, the housing comprising:
    a base;
    a top spaced from the base and configured for mounting to the rear surface of the substrate; and
    sidewalls extending between the base and the top, the base and sidewalls defining an interior volume of the housing, and the top defining an opening into the interior volume; and
  a frame for mounting at least one electrical power or data port in the opening of the substrate, the frame being connected relative to the housing and being spaced from the base in a direction toward the top, the frame having a front facing away from the base and a rear facing toward the base, the relative connection between the housing and the frame permitting adjustment of the spacing between the base and the frame.

The system may comprise at least one electrical power supply module in the interior volume, the electrical power supply module comprising a high voltage input for connection to mains power and a low voltage output connected to the at least one electrical power port, the electrical power supply module being laterally offset from the frame. The system may comprise two or more of the electrical power supply modules. The two or more electrical power supply modules may be connected to mains power in parallel.

A cover plate may be removably connected to the front of the frame, the cover plate having a front facing away from the frame, a back facing the frame, and one or more openings extending therethrough from the front to the back, each of the one or more openings for aligning with a corresponding one of said at least one power or data port. In use, the spacing between the base and the frame may be adjusted to make the front of the cover plate flush with the front surface of the substrate. The cover plate may be magnetically connected to the front of the frame. The cover plate may be seated on one or more bearing points defined between the cover plate and the frame. At least one end region of the cover plate may be devoid of said bearing points, said at least one end region being cantilevered from the bearing point closest to said at least one end region, such that pressing a corresponding end of the cover plate toward the frame causes the opposite end of the cover plate to move away from the frame.

An actuator may be provided for adjusting the spacing between the base and the frame. The actuator may be actuated from a front of the substrate. The frame may be connected relative to the housing via legs extending between the frame and the base of the housing. The actuator may comprise the legs. A first end of each of the legs may be threadedly engaged with the base, wherein rotating the legs in a first direction increases the spacing between the base and the frame and rotating the legs in a second direction opposite the first direction decreases the spacing between the base and the frame. An opposite second end of each of the legs may be configured for engagement by a torque applying tool, such as a screwdriver or socket, to facilitate rotation of the legs. The second end of each of the legs may be captively retained to the frame.

The relative connection between the housing and the frame may permit adjustment of the spacing between the base and the frame to a configuration in which the front of the frame extends distally, relative to the base, from the top. The relative connection between the housing and the frame may permit adjustment of the spacing between the base and the frame to a configuration in which the front of the frame extends distally, relative to the base, from the top by a distance of at least a thickness of the substrate minus a thickness of the cover plate, such that the front of the cover plate may be made flush with the front surface of the substrate. The relative connection between the housing and the frame may permit adjustment of the spacing between the base and the frame to a configuration in which the front of the frame extends distally, relative to the base, from the top by a distance of at least 15 mm or by a distance of at least 20 mm or by a distance of at least 25 mm or by a distance of at least 30 mm or by a distance of at least 35 mm.

The housing may comprise one or more drain openings to facilitate drainage of liquid from the interior volume.

The system may comprise at least one electrical power or data port mounted to the frame. The system may comprise at least one electrical power port mounted to the frame and at least one data port mounted to the frame. At least one of the at least one electrical power port and at least one of the at least one data port may comprise an electrical power port that is also a data port, such as a USB-C or USB-A port.

Each of the at least one electrical power or data port may be in an associated jack. Each said jack may be snap-lockingly engageable with the frame. Each said jack may be a keystone jack.

The top of the housing may comprise a peripheral flange extending outwardly from the sidewalls. The flange may have openings therein to receive fasteners for connecting the housing to the rear surface of the substrate.

The housing may be of an electrically conductive material, such as a metal, such as sheet steel. An electrical earthing point may be provided on the housing for earthing at least one high voltage component in the housing, such as high voltage input wiring connected to the high voltage input of the power supply module. The electrical earthing point may be provided on an interior surface of the housing. A cable gland may be provided in the housing.

Also disclosed herein is a modular power system for mounting to a substrate, the substrate having a front surface and a rear surface and an opening extending through substrate from the front surface to the rear surface, the system comprising:
  a housing for connection to the rear surface of the substrate, the housing comprising:
    a base;
    a top spaced from the base and configured for mounting to the rear surface of the substrate; and
    sidewalls extending between the base and the top,
    the base and sidewalls defining an interior volume of the housing, and the top defining an opening into the interior volume;
  a frame for mounting at least one electrical power port in the opening of the substrate, the frame being connected relative to the housing and being spaced from the base in a direction toward the top, the frame having a front facing away from the base and a rear facing toward the base; and
  an electrical power supply module in the interior volume, the electrical power supply module comprising a high voltage input for connection to mains power and a low voltage output connected to the at least one electrical power port, the electrical power supply module being laterally offset from the frame.

The system may comprise two or more of the electrical power supply modules. The two or more electrical power supply modules may be connected to mains power in parallel.

The relative connection between the housing and the frame may permit adjustment of the spacing between the base and the frame.

A cover plate may be removably connected to the front of the frame, the cover plate having a front facing away from the frame, a back facing the frame, and one or more openings extending therethrough from the front to the back, each of the one or more openings for aligning with a corresponding one of said at least one electrical power port. In use, the spacing between the base and the frame may be adjusted to make the front of the cover plate flush with the front surface of the substrate. The cover plate may be magnetically connected to the front of the frame. The cover plate may be seated on one or more bearing points defined between the cover plate and the frame. At least one end region of the cover plate may be devoid of said bearing points, said at least one end region being cantilevered from the bearing point closest to said at least one end region, such that pressing a corresponding end of the cover plate toward the frame causes the opposite end of the cover plate to move away from the frame.

An actuator may be provided for adjusting the spacing between the base and the frame. The actuator may be actuated from a front of the substrate. The frame may be connected relative to the housing via legs extending between the frame and the base of the housing. The actuator may comprise the legs. A first end of each of the legs may be threadedly engaged with the base, wherein rotating the legs in a first direction increases the spacing between the base and the frame and rotating the legs in a second direction opposite the first direction decreases the spacing between the base and the frame. An opposite second end of each of the legs may be configured for engagement by a torque applying tool, such as a screwdriver or socket, to facilitate rotation of the legs. The second end of each of the legs may be captively retained to the frame.

The relative connection between the housing and the frame may permit adjustment of the spacing between the base and the frame to a configuration in which the front of the frame extends distally, relative to the base, from the top. The relative connection between the housing and the frame may permit adjustment of the spacing between the base and the frame to a configuration in which the front of the frame extends distally, relative to the base, from the top by a distance of at least a thickness of the substrate minus a thickness of the cover plate, such that the front of the cover plate may be made flush with the front surface of the substrate. The relative connection between the housing and the frame may permit adjustment of the spacing between the base and the frame to a configuration in which the front of the frame extends distally, relative to the base, from the top by a distance of at least 15 mm or by a distance of at least 20 mm or by a distance of at least 25 mm or by a distance of at least 30 mm or by a distance of at least 35 mm.

The housing may comprise one or more drain openings to facilitate drainage of liquid from the interior volume.

The system may comprise at least one electrical power or data port mounted to the frame. The system may comprise at least one electrical power port mounted to the frame and at least one data port mounted to the frame. At least one of the at least one electrical power port and at least one of the at least one data port may comprise an electrical power port that is also a data port, such as a USB-C or USB-A port.

Each of the at least one electrical power or data port may be in an associated jack. Each said jack may be snap-lockingly engageable with the frame. Each said jack may be a keystone jack.

The top of the housing may comprise a peripheral flange extending outwardly from the sidewalls. The flange may have openings therein to receive fasteners for connecting the housing to the rear surface of the substrate.

The housing may be of an electrically conductive material, such as a metal, such as sheet steel. An electrical earthing point may be provided on the housing for earthing at least one high voltage component in the housing, such as high voltage input wiring connected to the high voltage input of the power supply module. The electrical earthing point may be provided on an interior surface of the housing. A cable gland may be provided in the housing.

Also disclosed herein is a subassembly for a modular power and/or data system for mounting to a substrate, the substrate having a front surface and a rear surface and an opening extending through substrate from the front surface to the rear surface, the subassembly comprising:

a frame for connection relative to the substrate, the frame being configured to mount at least one electrical power or data port in the opening of the substrate, the frame having a front and a rear;

a cover plate magnetically connected to the front of the frame and having one or more openings extending therethrough, each of the one or more openings aligning with a corresponding one of said at least one power or data port and seated on one or more bearing points defined between the cover plate and the frame, wherein at least one end region of the cover plate is devoid of said bearing points, said at least one end region being cantilevered from the bearing point closest to said at least one end region, such that pressing a corresponding end of the cover plate toward the frame causes the opposite end of the cover plate to move away from the frame.

BRIEF DESCRIPTION OF DRAWINGS

One or more embodiment of a modular power and data system embodying principles disclosed herein will now be described, by way of example only, with reference to the accompanying drawings, in which.

DESCRIPTION OF EMBODIMENTS

Figure 1:
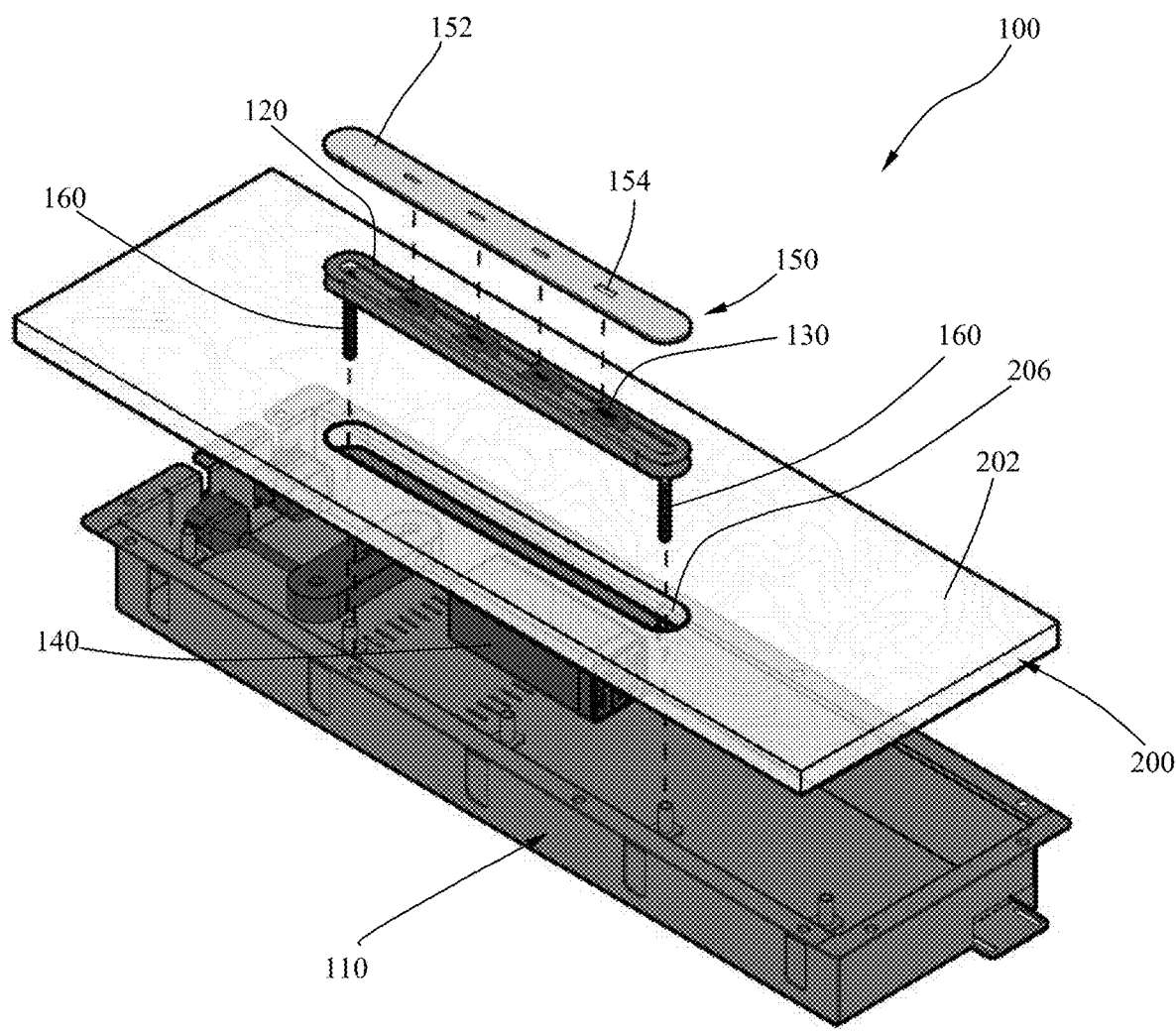
FIG. 1 is a partially exploded, top perspective view showing a modular power and data system embodying principles disclosed herein.
Figure 2:
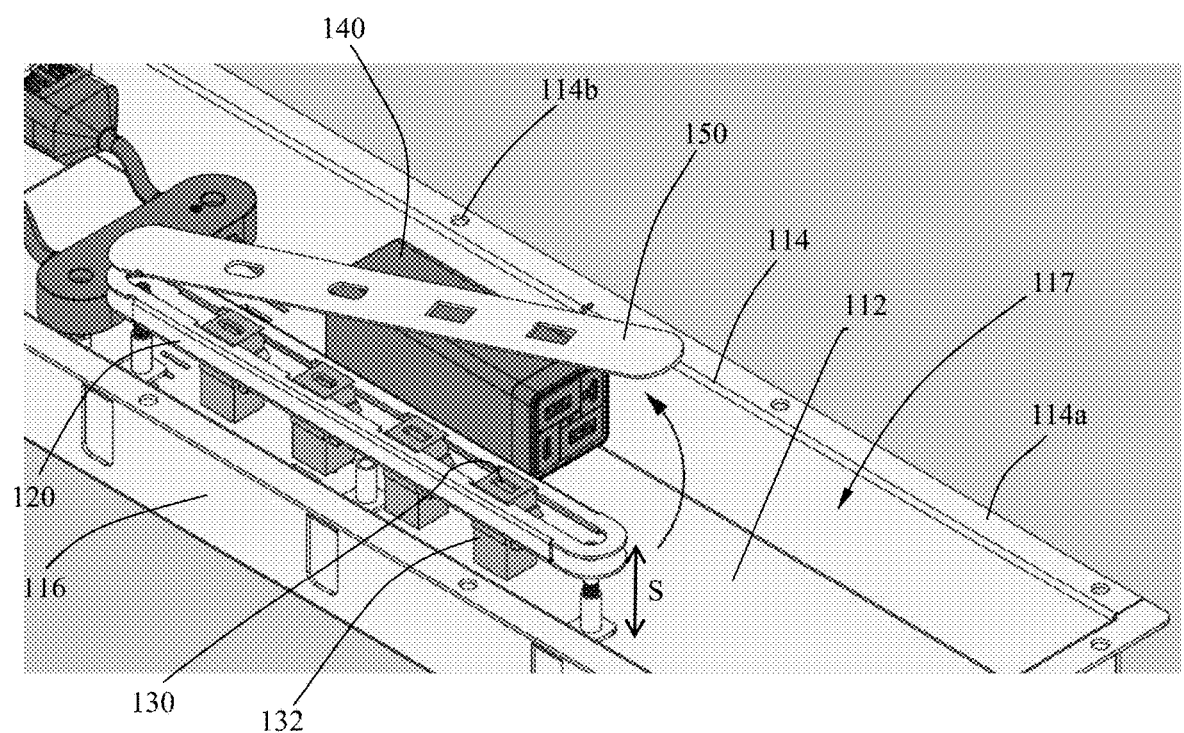
FIG. 2 is an assembled, top perspective view of the modular power and data system of FIG. 1, shown with its cover plate partially removed.
Figure 3:
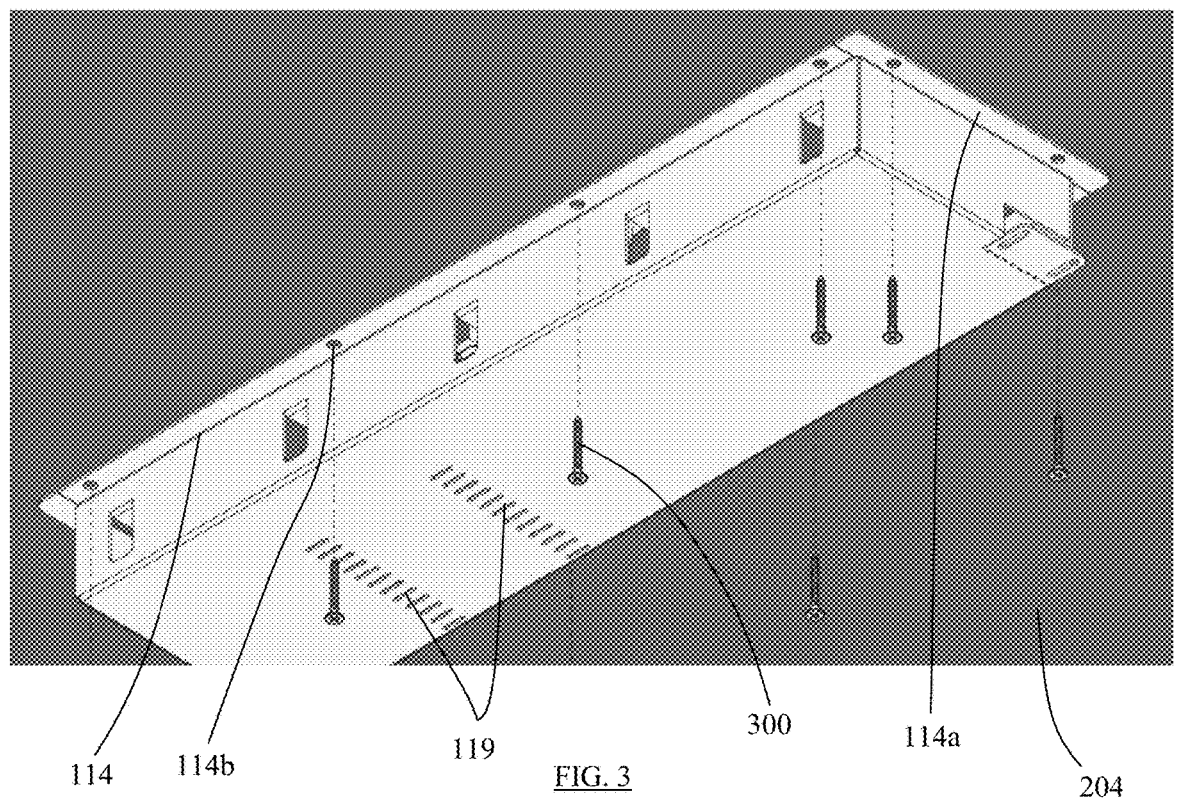
FIG. 3 is an assembled, bottom perspective view showing the modular power and data system of FIG. 1 being connected to the underside of a substrate.
Figure 4:
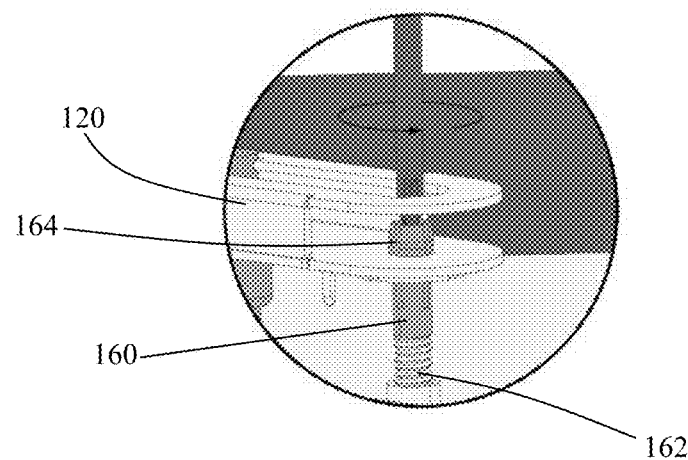
FIG. 4 is an enlarged view of part of the modular power and data system of FIG. 1 near one end of its frame.
Figure 5:
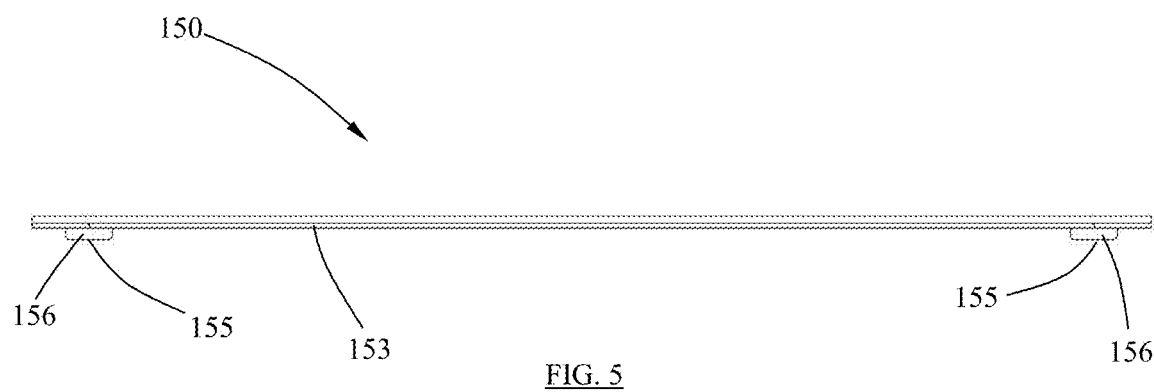
FIG. 5 is a side view of the cover plate of the modular power and data system of FIG. 1.
Figure 6:
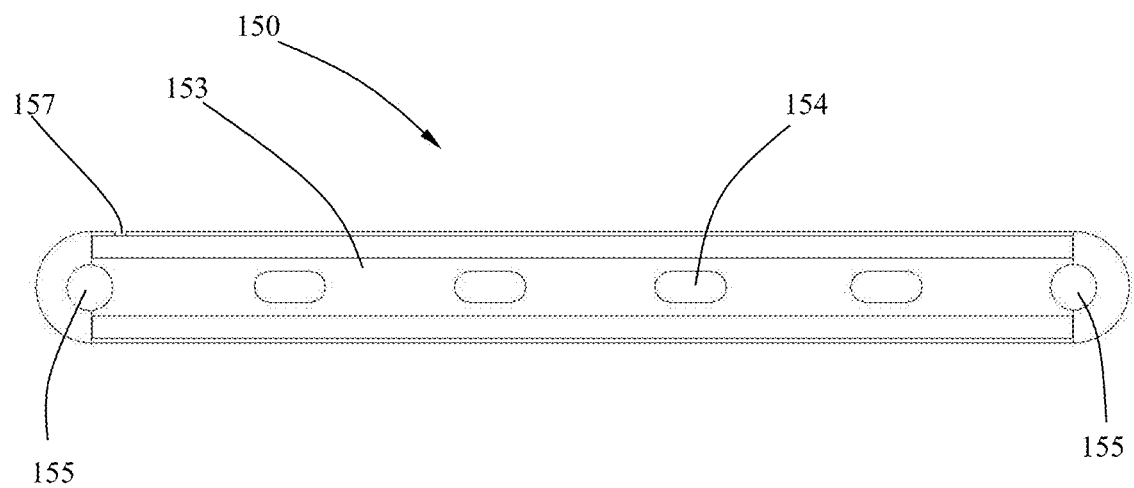
FIG. 6 is an underside view of the cover plate of the modular power and data system of FIG. 1.
Figure 7:
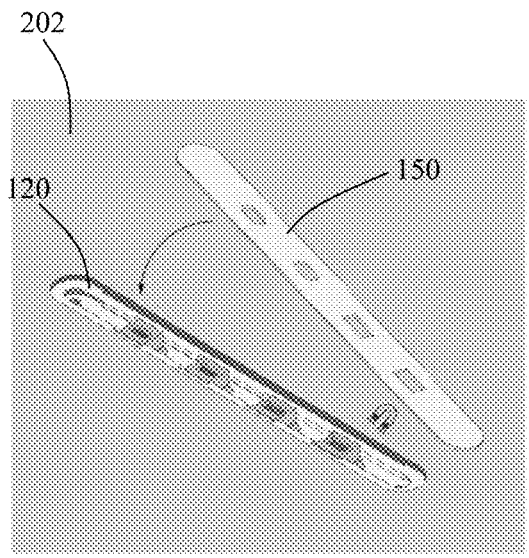
FIG. 7 is an assembled, top perspective view showing the modular power and data system of FIG. 1 connected to the substrate and having its cover plate installed.
Figure 8:
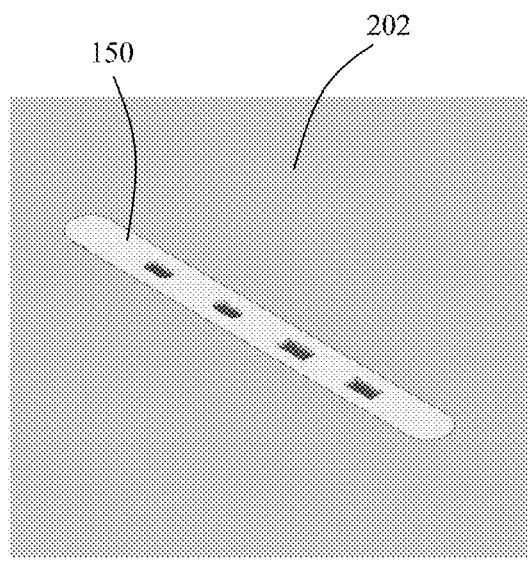
FIG. 8 is an assembled, top perspective view showing the modular power and data system of FIG. 1 connected to the substrate and with its cover plate installed.

Referring to the drawings, there is shown a modular power and/or data system 100 for mounting to a substrate 200. The substrate 200 has a front surface 202, a rear surface 204 and an opening 206 extending through substrate from the front surface to the rear surface. System 100 comprises a housing 110 for connection to the rear surface 204 of the substrate 200. Housing 110 comprises a base 112, a top 114 spaced from the base, and sidewalls 116 extending between the base 112 and the top 114. Top 114 has a peripheral flange 114a extending outwardly from sidewalls 116 and having openings 114b therein to receive fasteners, such as screws 300, for connecting housing 110 to rear surface 204 of substrate 200. Base 112 and sidewalls 116 define an interior volume 117 of the housing 110, and top 114 defines an opening into the interior volume 117.

A frame 120 for mounting at least one electrical power or data port 130 in the opening 206 of the substrate 200 is connected relative to the housing 110. In the illustrated embodiment, each of ports 130 is both an electrical power port and a data port, for example being a USB-A or USB-C port. Frame 120 is spaced from housing base 112 in a direction toward housing top 114. Frame 120 has a front 122 facing away from housing base 112 and a rear 124 facing toward housing base 112. The relative connection between housing 110 and frame 120 permits adjustment of a spacing S between housing base 112 and frame 120.

At least one electrical power supply module 140 is mounted in housing interior volume 117. Module 140 comprises a high voltage input 142 for connection to mains power and a low voltage output 144 connected to ports 130. Module 140 is laterally offset from frame 120 to reduce the risk of liquid ingress via substrate opening 206 reaching high voltage components of module 140 in embodiments in which system 100 is mounted horizontally. In some embodiments (not shown), system 100 comprises two or more of the electrical power supply modules 140 connected to mains power in parallel. Such embodiments may also have a greater number of ports 130, which may all be mounted on the same frame 120 or some on one from 120 and others on one or more other frame 120.

Figure 9:
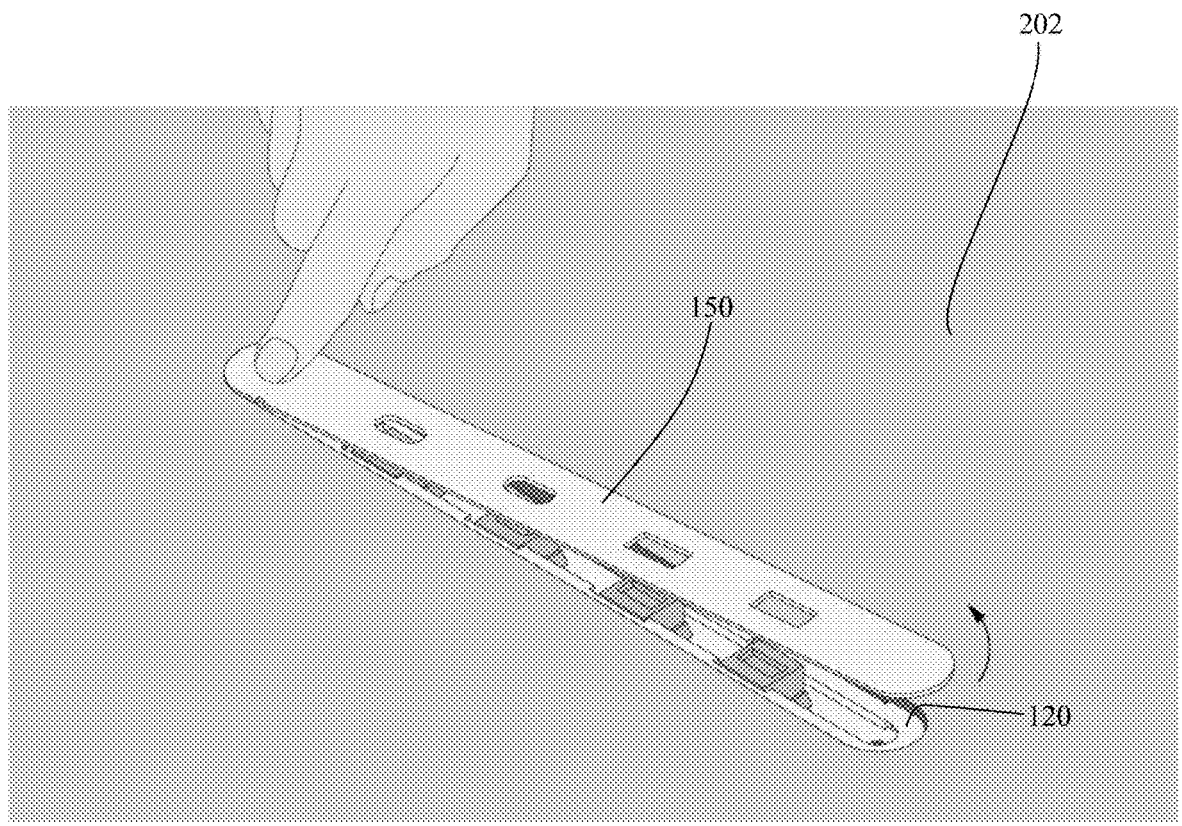
FIG. 9 is an assembled, top perspective view showing the modular power and data system of FIG. 1 connected to the substrate and having its cover plate removed.
Figure 10:
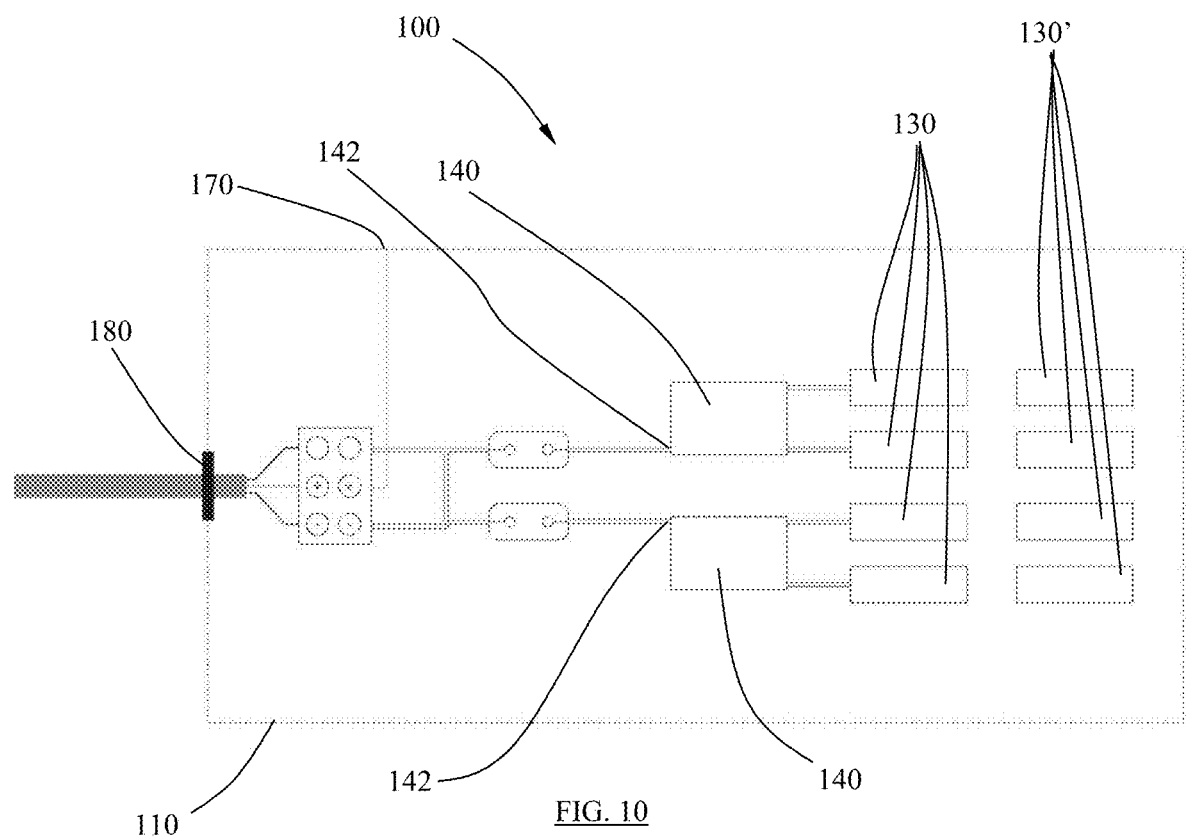
FIG. 10 is an electrical block diagram for a modular power and data system embodying principles disclosed herein.

A cover plate 150 is removably connected to front 122 of frame 120, the cover plate having a front 152 facing away from frame 120, a back 153 facing frame 120, and one or more openings 154 extending therethrough from the front to the back, each of the one or more openings 154 aligning with one of the a corresponding one of ports 130. In use, spacing S between housing base 112 and frame 120 is adjustable to make front 152 of cover plate 150 flush with front surface 202 of substrate 200. In the illustrated embodiment, cover plate 150 is magnetically connected to frame 120 and seated on one or more bearing points 155 defined between the cover plate and the frame. In the illustrated embodiment, bearing points 155 are defined by projections 156 extending from back 153 of cover plate 150. However, in other embodiments, bearing points may be defined, for example, by projections extending from front 122 of frame 120. A region at at least one end of cover plate 150 is, and in the illustrated embodiment, regions at both ends are, devoid of bearing points 155. Accordingly, the at least one region of the cover plate is cantilevered from the bearing point 155 closest that end region, such that pressing the corresponding end of the cover plate 150 toward frame 120 causes the opposite end of the cover plate to move away from the frame, as shown in FIG. 9. In addition or alternatively, a cutout 157 may be provided in a rim of cover plate 150 and a lever, such as a screwdriver, may be engaged with cutout 157 to prise cover plate 150 away from frame 120.

An actuator may be provided for adjusting spacing S between housing base 112 and frame 120. In the illustrated embodiment, the actuator comprises legs 160 extending between frame 120 and housing base 112, legs 160 having one end 162 threadedly engaged with housing base 112. A head 164 is provided at the other end of legs 160. With cover plate 150 removed, head 164 is accessible from a front of substrate 200 such that legs 160 can be actuated from the front of substrate 200. Rotating legs 160 in a first direction increases the spacing S between housing base 112 and frame 120 and rotating legs 160 in a second direction opposite the first direction decreases spacing S. Head 164 is configured for engagement by a torque applying tool, such as a screwdriver or socket, to facilitate rotation of legs 160. Leg heads 164 are captively retained to frame 120, such that legs 160 are free for rotation relative to frame 120 about their longitudinal axes but restrained against movement relative to frame 120 along their longitudinal axes.

The relative connection between housing 110 and frame 120, via legs 160, permits adjustment of spacing S between housing base 112 and frame 120 to a configuration in which front 122 of frame 120 extends distally, relative to housing base 112, from housing top 114. In the illustrated embodiment, the relative connection between housing 110 and frame 120, via legs 160, permits adjustment of spacing S between housing base 112 and frame 120 to a configuration in which front 122 of frame 120 extends distally, relative to housing base 112, from housing top 114 by a distance of at least a thickness of substrate 200 minus a thickness of cover plate 150, such that cover plate front 152 may be made flush with substrate front surface 202. Depending on the thickness of substrate 200 and cover plate 150, the relative connection between housing 110 and frame 120 may permit adjustment of spacing S between housing base 112 and frame 120 to a configuration in which frame front 122 extends distally, relative to housing base 112, from housing top 114 by a distance of at least 15 mm or by a distance of at least 20 mm or by a distance of at least 25 mm or by a distance of at least 30 mm or by a distance of at least 35 mm, such that cover plate front 152 may be made flush with substrate front surface 202. The threaded connection between legs 160 and housing base 112 may provide an adjustable range of at least 20 mm for spacing S.

Housing 110 comprises one or more drain openings 119 to facilitate drainage of liquid from housing interior volume 117.

Each port 130 is in an associated jack 132 that is snap-lockingly engageable with frame 120. In the illustrated embodiment, the jacks 132 are keystone jacks.

Housing 110 is of an electrically conductive material. In the illustrated embodiment, housing 110 is of metal, such as sheet steel. An electrical earthing point 170 is provided on an interior surface of housing 110 for earthing high voltage input wiring connected to high voltage input 142 of power supply module 140. A cable gland 180 is provided in housing sidewalls 116 or base 112 to seal around electrical or data cabling passing therethrough.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Examples of such variations and/or modifications include, but are not limited to:

spacing S between housing base 112 and frame 120 being adjustable by other means, such as legs 160 being telescopic or ends of frame 120 being slidably engaged with a track extending along housing sidewalls 116 between housing base 112 and housing top 114;

cover plate 150 being connected to frame 120 via other means, such as by screws or other mechanical fasteners; and/or frame 120 may mount additional data ports 130', such as HDMI ports or network cable ports, each of which may be in an associated jack that is snap lockingly engageable with frame 120.

What is claimed is:

1. A modular power and/or data system for mounting to a substrate, the substrate having a front surface and a rear surface and an opening extending through substrate from the front surface to the rear surface, the system comprising:
    a housing for connection to the rear surface of the substrate, the housing comprising:
        a base;
        a top spaced from the base and configured for mounting to the rear surface of the substrate; and
        sidewalls extending between the base and the top,
        the base and sidewalls defining an interior volume of the housing, and the top defining an opening into the interior volume; and
    a frame for mounting at least one electrical power or data port in the opening of the substrate, the frame and the housing having a direct or indirect connection to one another, the frame being spaced a distance from the base in a direction toward the top, the frame having a front facing away from the base and a rear facing toward the base, the direct or indirect connection permitting adjustment of the distance,
    wherein the direct or indirect connection comprises an actuator for bi-directionally adjusting the distance, the actuator being actuatable from in front of the substrate, and
    wherein the direct or indirect connection permits adjustment, via the actuator, of the distance to a configuration in which the front of the frame extends distally, relative to the base, from the top.

2. The system of claim 1, further comprising at least one electrical power supply module in the interior volume, the electrical power supply module comprising a high voltage input for connection to mains power and a low voltage output connected to the at least one electrical power port, the electrical power supply module being laterally offset from the frame.

3. The system of claim 1, further comprising a cover plate removably connected to the front of the frame, the cover plate having a front facing away from the frame and a back facing the frame.

4. The system of claim 3, wherein, in use, the distance is adjustable, via the actuator, to make the front of the cover plate flush with the front surface of the substrate.

5. The system of claim 3, wherein the cover plate is magnetically connected to the front of the frame.

6. The system of claim 5, wherein the cover plate is seated on one or more bearing points defined between the cover plate and the frame, wherein at least one end region of the cover plate is devoid of said bearing points, said at least one end region being cantilevered from the bearing point closest to said at least one end region, such that pressing a corresponding end of the cover plate toward the frame causes the opposite end of the cover plate to move away from the frame.

7. The system of claim 1, wherein the direct or indirect connection comprises legs extending between the frame and the base of the housing, wherein the actuator comprises the legs, wherein a first end of each of the legs is engaged with the base, wherein rotating the legs in a first direction increases the and rotating the legs in a second direction opposite the first direction decreases the distance.

8. The system of claim 7, wherein an opposite second end of each of the legs is configured for engagement by a torque applying tool to facilitate rotation of the legs.

9. The system of claim 1, comprising a cover plate removably connected to the front of the frame, the cover plate having a front facing away from the frame and a back facing the frame, and wherein the direct or indirect connection permits adjustment, via the actuator, of the distance to a configuration in which the front of the frame extends distally, relative to the base, from the top by a distance of at least a thickness of the substrate minus a thickness of the cover plate, to facilitate the front of the cover plate being made flush with the front surface of the substrate.

10. The system of claim 1, wherein the direct or indirect connection permits adjustment, via the actuator, of the distance to a configuration in which the front of the frame extends distally, relative to the base, from the top by a distance of at least 15 mm or by a distance of at least 20 mm or by a distance of at least 25 mm or by a distance of at least 30 mm or by a distance of at least 35 mm.

11. The system of claim 1, wherein the housing comprises one or more drain openings to facilitate drainage of liquid from the interior volume.

12. The system of claim 1, comprising at least one electrical power or data port mounted to the frame.

13. The system of claim 12, wherein each of the at least one electrical power or data port is in an associated jack that is snap-lockingly engageable with the frame.

14. The system of claim 1, wherein the housing is of an electrically conductive material and an electrical earthing point is provided on the housing for earthing at least one high voltage component in the housing.

* * * * *